United States Patent [19]
Hirose

[11] Patent Number: 5,014,801
[45] Date of Patent: May 14, 1991

[54] METHOD AND DEVICE FOR REAR-WHEEL STEERING OF AUTOMOTIVE VEHICLE

[75] Inventor: Kenji Hirose, Tokyo, Japan

[73] Assignee: Fuji Jikogyo Kabushiki Kaisha, Japan

[21] Appl. No.: 308,136

[22] Filed: Feb. 9, 1989

[30] Foreign Application Priority Data

Feb. 10, 1988 [JP] Japan .................. 63-29804

[51] Int. Cl.$^5$ .............................. B62D 7/14
[52] U.S. Cl. .................. 180/140; 364/424.05; 280/91
[58] Field of Search .......... 180/140, 142, 79.1; 364/424.05; 280/91

[56] References Cited

U.S. PATENT DOCUMENTS

| | | | |
|---|---|---|---|
| 4,660,671 | 9/1987 | Behr et al. | 180/142 |
| 4,779,693 | 10/1988 | Takahashi et al. | 180/140 |
| 4,782,907 | 11/1988 | Morishita | 180/140 |
| 4,869,335 | 9/1989 | Takahashi | 280/91 |

FOREIGN PATENT DOCUMENTS

| | | | |
|---|---|---|---|
| 60-78870 | 5/1985 | Japan | 280/91 |
| 60-92983 | 5/1985 | Japan | 280/91 |
| 60-94869 | 5/1985 | Japan | 280/91 |
| 61-81870 | 4/1986 | Japan | 180/142 |
| 61-175183 | 8/1986 | Japan | 180/140 |
| 62-139757 | 6/1987 | Japan | 280/91 |
| 63-64877 | 3/1988 | Japan | 180/140 |
| 61-95978 | 4/1989 | Japan | 180/140 |
| 61-178083 | 7/1989 | Japan | 180/140 |
| 61-215670 | 8/1989 | Japan | 180/140 |

Primary Examiner—Richard A. Bertsch
Assistant Examiner—Karin Tyson
Attorney, Agent, or Firm—Beveridge, DeGrandi & Weilacher

[57] ABSTRACT

In an automotive four-wheel steering system having a control unit for operating in response to various sensors associated with the front-wheel and rear-wheel steering systems to control the steering of the rear wheels. The control unit includes a first sensor for detecting front-wheel steering force or front-wheel assist (power) steering force, or cornering force occurring in the front wheels, a second sensor for detecting front-wheel steering speed, and a sensor abnormality determination device for operating, when a difference occurs between the values detected by the first sensor and the direction of the front-wheel steering speed detected by the second sensor, to indicate that an abnormality has occurred in either of the first or second sensors. Thus fail-safe operation is assured.

6 Claims, 2 Drawing Sheets

STEERING LEFT

STEERING RIGHT

METHOD AND DEVICE FOR REAR-WHEEL STEERING OF AUTOMOTIVE VEHICLE

BACKGROUND OF THE INVENTION

This invention relates to steering systems for automotive vehicles and more particularly to a rear-wheel steering device for an automotive vehicle (hereinafter referred to as vehicle or car) having a four-wheel steering system.

Steering by means of the steering wheel to steer the front wheels and also to steer the rear wheels is known. In a vehicle of this type, the ratio between the rear-wheel steering angle $\theta_r$ and the front-wheel steering angle $\theta_f$, that is, the ratio $k(=\theta_r/\theta_f)$ is variable in accordance with the driving speed.

At low speeds, the rear wheels are caused to turn in the reverse direction of that of the front wheels (so-called "reverse-phase steering") for the purpose of improving the vehicle turning characteristic. In the medium and high speed range, the rear wheels are caused to turn in the same direction as that of the front wheels (so-called "coincident-phase steering"), and at the same time, as the vehicle speed increases, control is so carried out that the rear/front wheel steering angle ratio k mentioned above gradually approaches 1 (one thereby to improve the stability of the vehicle with respect to steering maneuvers during high-speed driving. Four-wheel steering systems having these features have been developed in the prior art as disclosed in Japanese Patent Laid-Open Publication No. 11173/1982.

In spite of the progress made in the prior art, a number of unsolved problems still remain. For example, in a four-wheel steering system of this type there is a need for the provision of fail-safe devices such as a sensor for detecting the front wheel steering angle and transmitting a corresponding signal to a control unit and for the provision in this control unit of diagnostic means which can detect any abnormality or malfunctioning such as a short-circuit or a conductor breakage in the various circuits connected to this control unit. Such diagnostic means can operate in instant response to such detection to stop the rear-wheel steering control and place the steering system in the normal condition having no rear-wheel steering means, that is, in the condition wherein only the front wheels are steered by the manipulation of the steering wheel.

In one example of a fail-safe device provided in a known rear wheel steering system, in order to improve the capability of detecting abnormalities, a plurality of sensors, for example, for detecting the front wheel steering angle and steering speed of the front wheel are provided, and the outputs of these sensors are compared. When only one front wheel steering angle sensor is used, whether or not its output is within the normal operational range specific to this sensor is verified in another method. These are ordinarily practiced methods. In the case of the former method, high cost becomes a problem. In the case of the latter method, there is a problem in that detection of differences in the polarity of the front wheel steering angle signal transmitted from the front-wheel steering angle sensor is difficult. That is, even when the steering wheel is manipulated for a right-turn, a front-wheel steering angle signal indicates a left-turn steering condition. If this output is within the aforementioned normal operational range, it cannot be detected as being abnormal.

SUMMARY OF THE INVENTION

It is an object of this invention to provide a device for improving the accuracy in detecting sensor abnormalities such as in a front-wheel steering torque sensor (hydraulic sensor) through the use of the above mentioned front-wheel steering speed. Also, in a rear-wheel steering system of a vehicle in which, by adding a device for detecting the front-wheel steering speed and by controlling the rear-wheel steering speed according to the front-wheel steering speed, excessive delay in rear-wheel steering during rapid steering wheel manipulation is avoided for, and the rear wheels are steered after an appropriate delay.

According to this invention there is provided a method of steering the rear wheels of an automotive vehicle having front-wheel and rear-wheel steering systems, which method comprises: obtaining a first detection signal indicating a front-wheel steering force of the front-wheel steering system, or front-wheel steering assist force, or cornering force occurring in the front wheels, a second detection signal indicating the steering speed of the front-wheel steering system, a third detection signal indicating a rear-wheel steering angle of the rear-wheel steering system, and a fourth detection signal indicating the driving speed of said vehicle; providing means for computing a desired value for the rear-wheel steering speed from the first through fourth detection signals and at the same time computing a desired value for the rear-wheel steering angle from the first and fourth detection signals; and steering the rear wheels in correspondence with the desired values by a motive power means; and assuring correct and positive operation of the steering systems by providing sensor abnormality determination means for operating, when a difference occurs between the first detection signal and the front-wheel steering speed indicated by the second detection signal, to judge that an abnormality has arisen in either of the values indicated by the first and second detection signals.

This invention in another aspect thereof provides a rear-wheel steering device for an automotive vehicle in which the steering angle of the rear wheels is controllably varied to an appropriate value when a cornering force occurs in the front wheels as a consequence of an external disturbance other than the manipulation of the steering wheel, and the driving characteristics of the vehicle are improved by steering the rear wheels according to a desired value for the rear-wheel steering angle from the detected value of the front-wheel steering force, or for a front wheel steering assist force, or for a cornering force occurring in the front wheels and the driving speed. At the same time, by controlling the rear-wheel steering speed by detecting the steering speed of the front wheels and determining a value of the rear-wheel steering speed from this front wheel steering speed and the vehicle speed, excessive delay in rear-wheel steering during rapid steering wheel manipulation is compensated, and the rear wheels can be steered after an appropriate delay.

In the rear-wheel steering system as described above, this invention provides detecting means for detecting an abnormality of the sensor for determining the occurrence of an abnormality in the detection of the front-wheel steering torque, the front-wheel steering assist torque, or a cornering force in the front wheels or in the detection of the front-wheel steering speed, when a difference occurs between the signal representative of the front-wheel steering torque, the front-wheel steering assist torque, or the front-wheel cornering force and the direction signal representative of the front-wheel steering speed.

According to this invention, using too many sensors for detecting detected abnormalities in the steering system of the rear wheels can be avoided. At the same time, abnormality detection which is remarkably more accurate can be carried out as opposed to a method of detecting abnormalities separately for each item. As a result, an even more reliable fail-safe operation of the system as a whole becomes possible.

This invention will be more clearly understood from the following detailed description with respect to a preferred embodiment of the invention and the accompanying drawings.

DETAILED DESCRIPTION OF THE INVENTION

Figure 1:
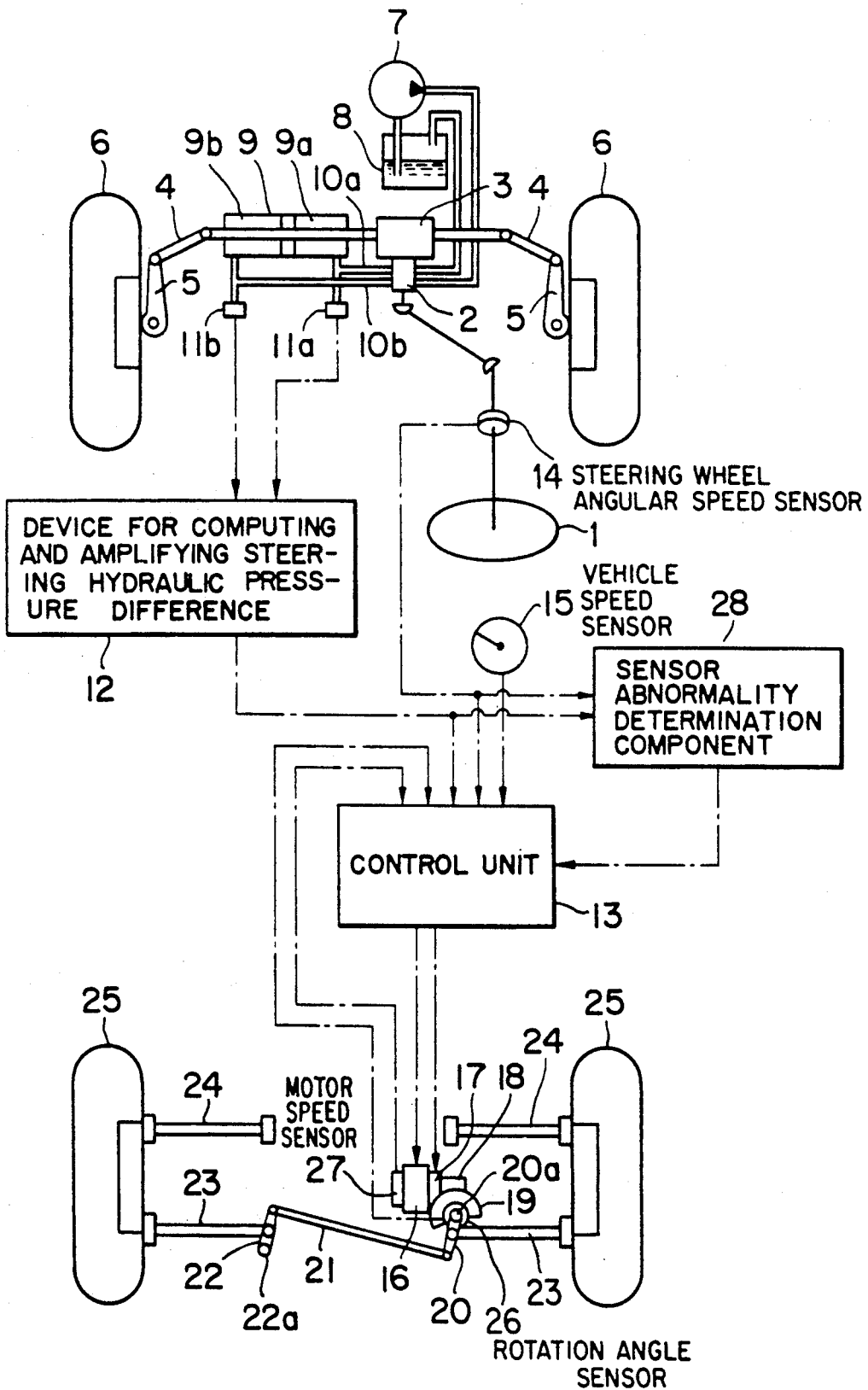
FIG. 1 is a combination of a schematic plan view and a block diagram showing an example of the steering system according to this invention.

Referring first to FIG. 1, the front wheels 6 of the vehicle are steered to the left or right by rotating the steering wheel 1, and the rotational torque of the steering wheel is transmitted by way of a gear box 3 (for front-wheel steering), tie rods 4, and knuckle arms 5 to the front wheels 6. At the same time, the steering torque of the steering wheel 1 actuates a control valve 2, and the control valve 2 delivers oil to a hydraulic (oil-pressure) pump 7 driven by the vehicle engine (not shown) through either of left and right hydraulic lines 10a, 10b to the corresponding one of the left and right hydraulic chambers 9a and 9b of a hydraulic power cylinder 9 thereby to generate hydraulic auxiliary torque for steering in the desired direction, whereby the manual turning force required to rotate the steering wheel is reduced. The above mentioned hydraulic pump 7 provides hydraulic fluid (oil) from a reservoir tank 8 to the hydraulic power cylinder 9.

Left and right hydraulic pressure sensors 11a and 11b are respectively installed at intermediate portions of the above described left and right hydraulic lines 10a and 10b, and the sensors 11a and 11b operate to detect hydraulic pressure in the hydraulic lines 10a and 10b and to transmit corresponding hydraulic pressure detection signals to a device 12 for computing and amplifying the steering hydraulic pressure difference.

This device 12 computes a steering assist torque from the difference between the two output signals of the two hydraulic pressure sensors 11a and 11b and transmits an output signal representative of the steering assist torque to a control unit 13.

The steering wheel mechanism is provided with a steering wheel angular speed sensor 14 which operates in response to the rotation of the steering wheel 1 to determine the steering rotational direction thereof and to detect the angular speed thereof. The steering wheel angular speed sensor 14 operates to transmit a steering angular speed signal to the control unit 13 in accordance with this angular speed. A vehicle speed sensor 15 is provided to detect the vehicle speed and to transmit a corresponding vehicle speed signal to the control unit 13.

The rear wheels 25, 25 of the vehicle are mounted on the chassis frame (not shown) of the vehicle via a rear wheel suspension which includes rear lateral links 23 and front lateral links 24.

These rear wheels are actuated to steer left and right by a rear-wheel steering mechanism, the main structures of which are: an electric motor 16 controlled by signals from the control unit 13; an electromagnetic clutch 17 actuated by the motor 16; a worm gear 18 to rotate a worm sector 19 through the clutch 17; a rotating shaft 20a on which the worm sector 19 is fixedly supported; a right-side lever 20 fixed at one end to the rotating shaft 20a and pivotable at an intermediate point with respect to the inner (left) end of the above mentioned rear lateral link 23 on the right side; a connecting rod 21 connected at the right end to the other end of the right-side lever 20; and a left-side lever 22 pivotally supported at its one end by a pivotal shaft 22a and pivotably connected at the distal end to a left end of the connecting rod 21. At an intermediate position on the lever 22, the right end of the rear lateral link 23 is connected to the left side of the link 23. The outer ends of the rear lateral links 23 are connected respectively to the left and right rear-wheel assemblies. Outer ends of the front lateral links 24 are substantially parallel to the links 23 and are spaced apart from the rear lateral links 23. The outer ends of the front lateral links 24 are similarly connected respectively to the rear-wheel assemblies. The inner ends of the front lateral links 24 are pivotally connected to parts of the vehicle chassis (not shown).

In the operation of this rear-wheel steering mechanism, the rotational power of the motor 16 is transmitted via the electromagnetic clutch 17 to rotate the worm gear 18. The switch of the clutch 17 is turned ON when the vehicle engine is started. The rotation of the worm gear 18 is thus transmitted at low speed to the worm sector 19, the rotating shaft 20a, and the right-side lever 20. The swinging motion of the right-side lever 20 is transmitted by the connecting rod 21 to swing the left-side lever 22 about the pivotal shaft 22a.

At the same time, the rear lateral links 23 are actuated by the swinging motion of the right-side and left-side levers 20 and 22 to move substantially in a lateral direction with respect to the vehicle chassis, whereby the rear wheels 25 are steered in the corresponding angular direction.

A rotational angle sensor 26 is connected to the rotating shaft 20a of the worm sector 19 and the right-side lever 20 to detect the rotational angle of the same. In addition, a motor speed sensor 27 is mounted on the motor 16 to detect the rotational speed thereof. Output signals of the rotational angle sensor 26 and the motor speed sensor 27 are transmitted to the control unit 13.

From the difference of the two output signals of the two hydraulic pressure sensors 11a and 11b, the device 12 computes the required steering assist torque and produces the corresponding steering assist torque signal. The control unit 13 determines the steering direction of the rear wheels and a reference value of the rear wheel steering angle from the steering assist torque output signal and the vehicle speed signal outputed by the vehicle speed sensor 15. At the same time, the control unit 13 computes the rotational direction of the motor 16 and a first reference value of rotational speed for the motor from the steering angular speed signal of the steering wheel angular speed sensor 14 and the vehicle speed signal from the vehicle speed sensor 15.

Furthermore, the control unit 13 computes a second reference value for the motor speed corresponding to the magnitude of the abnormality or difference between the above mentioned reference value of the rear-wheel steering angle and the actual value of the rear-wheel steering angle according to the input signal from the rotational angle sensor 26 in the direction for reducing the abnormality. With the sum of the first and second reference values of the motor speed thus computed, the control unit 13 sets the reference value of the motor speed. On the basis of the difference between this reference value of the motor speed and the present motor speed according to the input signal from the motor speed sensor 27, the control unit 13 transmits a signal for driving the motor 16.

In the above described control, if turning of the steering wheel is fast, the motor speed reference value is set by a first reference value of the motor speed on the higher side, whereby a characteristic of the initial rising of the rear wheel steering is improved In the case where the wheels are subjected to an external disturbance during high-speed driving, the movements of the vehicle due to the external disturbance are detected by way of cornering forces generated in the front wheels in spite of the steering wheel being maintained in the straight-ahead driving position. These cornering forces are detected as differences in the hydraulic pressures in the left and right hydraulic pressure chambers 9a and 9b of the hydraulic power cylinder 9, whereby the rear wheels are steered to stabilize the vehicle. Similarly, in the case of abrupt deceleration during turning of the vehicle, also, the steering angle of the rear wheels is increased even though the steering wheel angle is held in a fixed state, whereby there is a effect of suppressing the so-called tuck-in phenomenon, and the stability of the vehicle itself is improved.

In the rear-wheel steering system for a vehicle as described above, the present invention provides a sensor abnormality determination component 28 for determining the occurrence of an abnormal condition in the hydraulic pressure sensors 11a and 11b, in the computing device 12 for computing and amplifying the steering hydraulic pressure difference, or in the steering wheel angular speed sensor 14 when a difference occurs between (1) the direction of the steering assist torque indicated by a steering assist torque signal transmitted by the computing device 12 on the basis of the output signals of the two hydraulic pressure sensors 11a and 11b and (2) the direction of the steering angular speed indicated by the steering angular speed signal transmitted from the steering wheel angular speed sensor 14.

Figure 2:
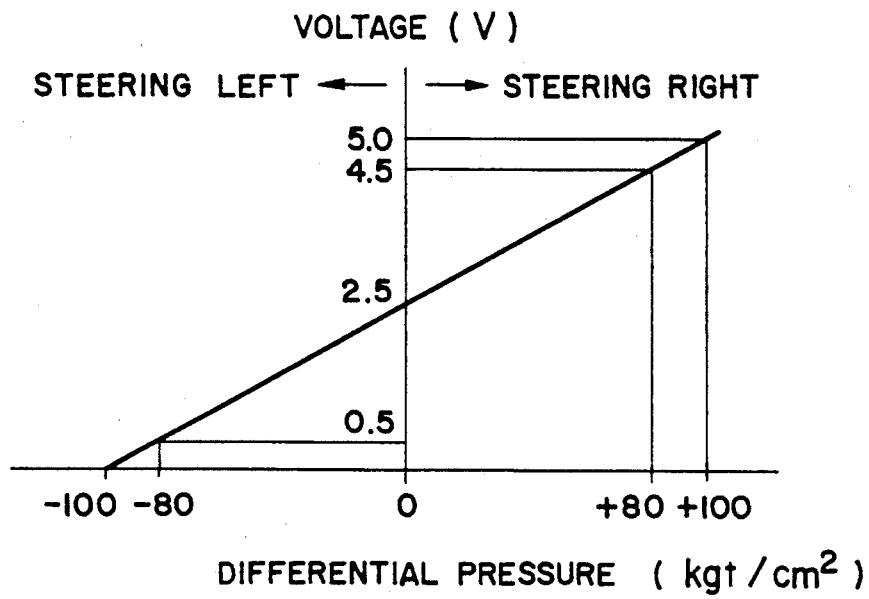
FIG. 2 is a graph indicating the relationship between the output of a device for computing and amplifying a hydraulic pressure difference steering signal and the differential pressure in the hydraulic lines.

More specifically, when there is no difference between the output signals of the left and right hydraulic pressure sensors 11a and 11b, the output voltage of the computing device 12 is 2.5 volts. That is, the time when the difference pressure is zero, as indicated in FIG. 2. At the time of a right turn when the hydraulic pressure of the left hydraulic pressure chamber 9b of the power cylinder 9 is higher than that of the right chamber 9a, the difference pressure is positive. The output voltage of the device 12 is higher than the 2.5 volts present at the time when the pressure difference is zero. Then, when the pressure in the right hydraulic chamber 9a is higher than that in the left chamber 9b at the time of steering left, the pressure difference is negative. The output voltage of the device 12 becomes lower than the 2.5 volts at the time when the pressure difference is zero. Therefore, depending on whether this output voltage is higher or whether it is lower than 2.5 volts corresponding to zero difference pressure, it can be determined whether the steering assist torque is acting in the rightward steering direction or whether it is acting in the leftward steering direction.

Figure 3A:
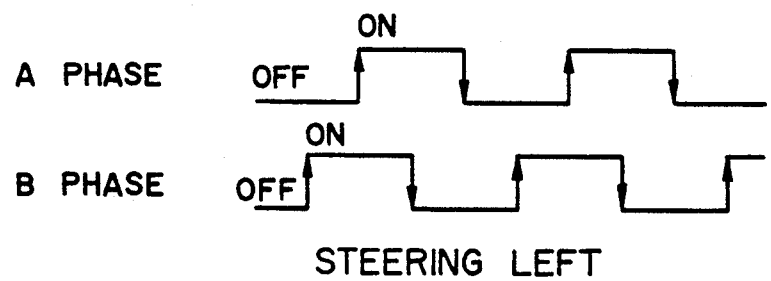
FIGS. 3A and 3B are output characteristic diagrams showing the output of a rotary encoder respectively for steering left and steering right and generation of two-phase pulse signals having a 90 degree phase difference whereby the encoder is used as a steering wheel angular speed sensor.
Figure 3B:
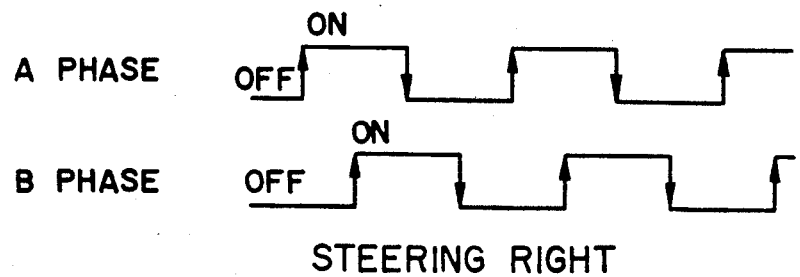

A rotary encoder produces two-phase pulse signals having a phase difference of 90 degrees as indicated in FIGS. 3A and 3B. In the case where the rotary encoder is used for the steering wheel angular speed sensor 14, the rising sequence of the pulses between these two-phase pulse signals is reversed depending o whether the steering is leftward or whether it is rightward. Therefore, from the rising sequence of these pulses, the direction of steering can be determined.

When there is a timing difference between the output signals of the computing device 12 and the steering wheel angular speed sensor 14, erroneous movements due to this timing difference can be prevented by observing whether or not one of the signals has been provided within a predetermined time. For example, the predetermined time is 1 second from the time that the other signal was outputed.

While, in the above described example, a rotary encoder is used as the steering wheel angular speed sensor 14, an electric generator for a speedometer of the direct-current type may be used instead of the device for generating an analog signal similarly as in the computing device 12. In this case, the direction of the steering angular speed can be determined from the polarity, positive or negative, of the output signal.

The above described example illustrates the application of this invention to a power steering system. In the case of an automotive vehicle without a power steering system, a similar effect as in the above described example can be obtained by providing a sensor for detecting the steering wheel steering torque (for example, a steering torque sensor). The rear-wheel steering direction and the reference value for the rear-wheel steering angle are determined from the output signal of this steering torque sensor and from the output signal of the vehicle speed sensor, as illustrated in FIG. 1.

While the presently preferred embodiment of the present invention has been shown and described, it is to be understood that this disclosure is for the purpose of illustration and that various changes and modifications may be made without departing from scope of the invention as set forth in the appended claims.

As described hereinabove, this invention relates to a rear-wheel steering system in which, the reference value of the rear-wheel steering angle is determined from the detected value of the front-wheel steering torque, of the front-wheel steering assist torque, or of a cornering force generated in the front wheels and from the vehicle speed. The rear wheels thus are steered. When a cornering force occurs in the front wheels as a consequence of an external disturbance without the manipulation of the steering wheel, the steering angle of the rear wheels is controllably varied to an appropriate value. Therefore the driving characteristics of the vehicle are improved. At the same time, by controlling the rear wheel steering speed, excessive delay in the response of the rear-wheel steering at the time of rapid steering wheel manipulation is compensated. The control of the rear wheel steering speed is obtained by detecting the steering speed of the front wheels and by determining the reference value of the rear wheel steering speed from this steering speed and the vehicle speed. Therefore the rear wheels can be steered with an appropriate delay.

In the vehicle wheel steering system as described above, this invention provides the sensor abnormality determination means for determining that an abnormality has occurred in the detection of the front-wheel steering torque, the front-wheel steering assist torque, or a cornering force in the front wheels or in the detection of the front-wheel steering speed when a difference arises between the direction of variation of the front wheel steering torque, the front wheel steering assist torque, or the front-wheel cornering force and the direction of the front-wheel steering speed.

According to the invention, using too many sensors for each item can be avoided At the same time, an abnormality detection becomes more accurate and reliable than a method of detecting an abnormality separately for each item. As a result, an even more reliable fail-safe operation for the system as a whole becomes possible, whereby a great beneficial effect can be expected in a actual practical procedure.

What is claimed is:

1. A method of steering rear wheels for an automotive vehicle having a front-wheel steering system and a rear-wheel steering system, which method comprises:
   providing a first detection signal indicative of front-wheel steering force;
   providing a second detection signal indicative of front-wheel steering speed;
   providing a third detection signal indicative of a rear-wheel steering angle;
   providing a fourth detection signal indicative of vehicle speed;
   computing a rear-wheel steering angle reference value and a desired rear-wheel steering speed value based upon said first through fourth detection signals;
   steering the rear wheels in accordance with said rear-wheel steering angle reference value and said desired rear-wheel steering speed value;
   detecting whether there is a discrepancy between front-wheel steering force indicated by said first detection signal and front-wheel steering speed indicated by said second detection signal; and
   determining an abnormality when a discrepancy is detected between said first and second detection signals;
   said computing step comprising the steps of (a) computing a rear-wheel steering angle reference value from said first and fourth detection signals, (b) computing a first reference value from said second and fourth detection signals, (c) computing a second reference value from said rear-wheel steering angle reference value and said third detection signal, and (d) computing said desired rear-wheel steering speed value based upon said first reference value and said second reference value.

2. The method according to claim 1, wherein said first detection signal is indicative of front-wheel steering assist force.

3. The method according to claim 1, wherein said first detection signal is indicative of cornering force occurring in the vehicle's front wheels.

4. A rear-wheel steering device for an automotive vehicle having a front-wheel steering system and a rear-wheel steering system which steers the vehicle's rear wheels in accordance with a rear-wheel steering angle reference value and a rear-wheel steering speed value, said device comprising,
   first means for detecting front-wheel steering force and generating a front-wheel steering force signal indicative thereof;
   second means for detecting front-wheel steering speed and producing a steering speed signal indicative thereof;
   third means for detecting a rear-wheel steering angle and providing a rear-wheel steering angle signal indicative thereof;
   fourth means for detecting vehicle speed and producing a vehicle speed signal indicative thereof;
   computing means responsive to outputs from said first through forth means for computing a rear-wheel steering angle reference value and a desired rear-wheel steering speed value for said rear-wheel steering system, and
   abnormality determination means for determining an occurrence of an abnormality in either said first or second means based upon a difference between a front wheel steering force signal from said first means and a front-wheel steering speed signal detected by said second means;
   said computing means computing (a) a rear-wheel steering angle reference value in response to front-wheel steering force and vehicle speed signals respectively transmitted from said first and fourth means, (b) a first reference value based upon front-wheel steering speed and vehicle speed signals from said second and fourth means, (c) a second reference value based upon said rear-wheel steering angle reference value and a rear wheel steering angle signal from said third means, and (d) a desired rear-wheel steering speed value for said rear-wheel steering system based upon said first and second reference values.

5. The rear-wheel steering device according to claim 4, wherein said first means generates signals indicative of front-wheel steering assist force.

6. The rear-wheel steering device according to claim 4, wherein said first means generates signals indicative of cornering force occurring in the vehicle's front wheels.

* * * * *